June 14, 1960  H. J. BUTLER  2,940,547
SERVO-ASSISTED DISC BRAKES
Filed Sept. 28, 1956  3 Sheets-Sheet 1
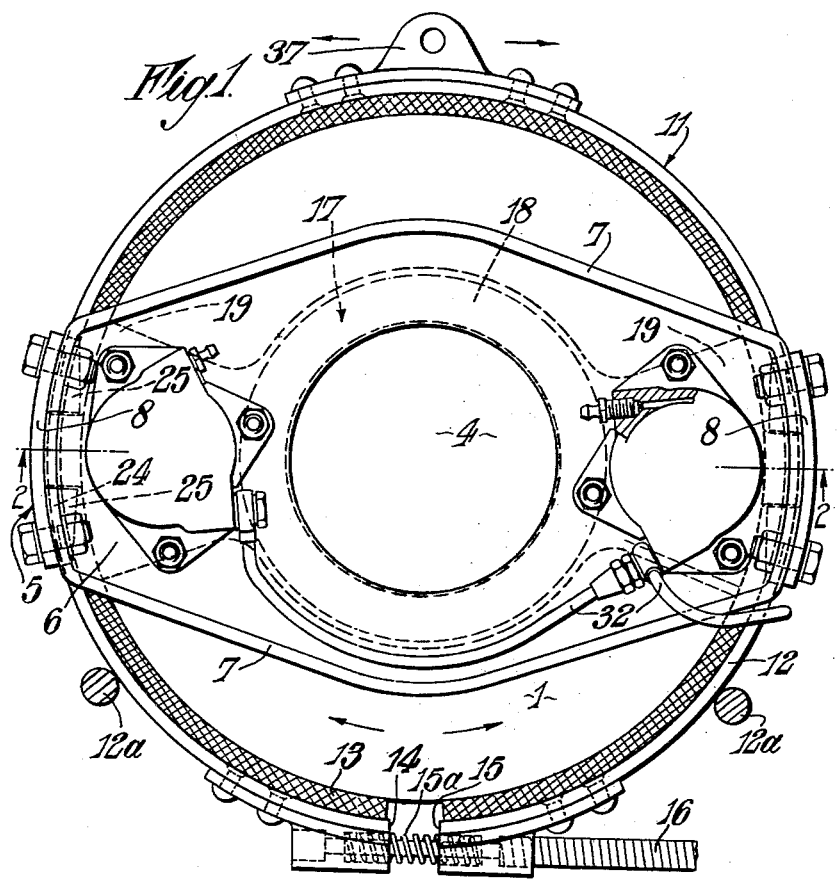
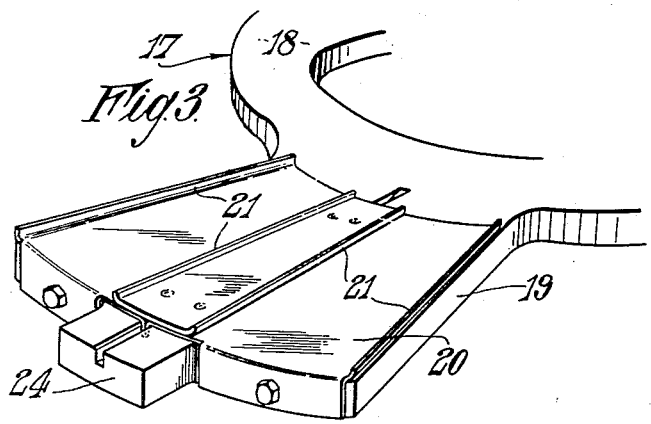
INVENTOR
Henry James Butler
by Benj. T. Rauber
his attorney

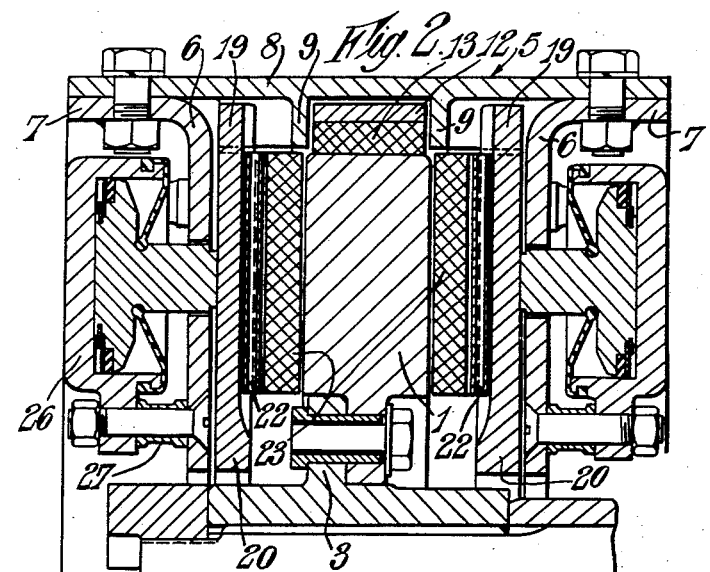
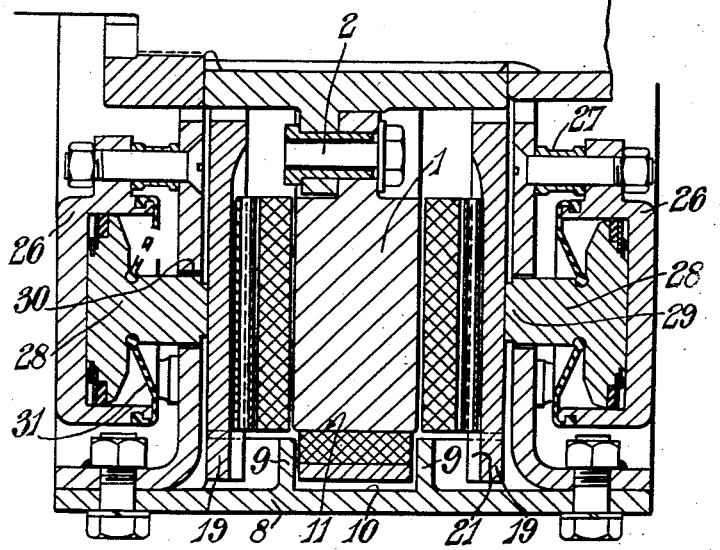

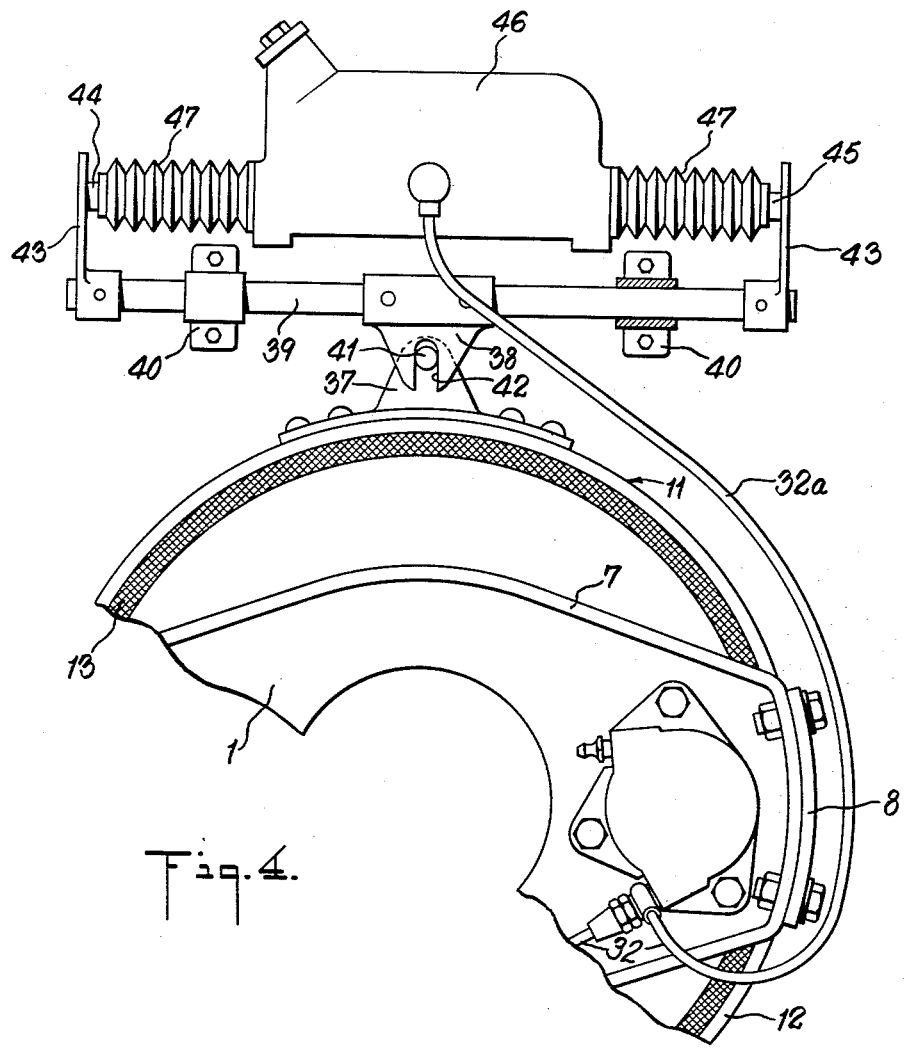

2,940,547
SERVO-ASSISTED DISC BRAKES

Henry James Butler, Sutton Coldfield, England, assignor to Dunlop Rubber Company Limited, London, England, a British company Filed Sept. 28, 1956, Ser. No. 612,629

Claims priority, application Great Britain Nov. 9, 1955

5 Claims. (Cl. 188—70)

This invention relates to servo-brakes and more particularly to servo-assisted disc brakes.

Fluid-pressure operated servo-assisted disc brakes have been proposed in which operation of a primary braking cylinder rotates an angularly movable torque plate which in turn pressurizes the main or secondary braking cylinders to effect full frictional engagement on the disc. The object of the present invention is to provide an alternative design of fluid-pressure operated servo disc brake which is particularly suitable for tanks, heavy vehicles and the like.

According to the present invention a servo-assisted disc brake comprises a rotatable disc, a primary brake comprising a brake shoe to frictionally engage the outer periphery of said disc and angularly movable thereby, means to apply the primary brake, a secondary brake comprising pads of friction material to frictionally engage the radially-extending sides of said disc, fluid-pressure operated mechanisms to operate said secondary brake, and means actuated by angular movement of said brake shoe to operate a master-cylinder or like mechanism to thereby pressurize said secondary brake-operating mechanisms.

Preferably the primary brake comprises a flexible band having friction material secured thereto which partially encircles the disc and frictional engagement between the friction material and the outer periphery of the disc is effected by a cable and lever mechanism. The angularly-movable band is connected by a mechanical linkage with the plunger of a master-cylinder which is in turn connected by a pipe or pipes to the fluid pressure operated mechanisms which operate the secondary brake. The secondary brake comprises two pairs of friction pads, one of each pair being axially-aligned one on each side of the disc and each pair is diametrically-opposed on opposite sides of the disc. The pads are slidably located in a non-rotatable substantially-rectangular torque plate which extends diametrically across both sides of the disc, the ends being connected together adjacent the periphery of the disc by means which also serve to locate the primary brake. The secondary brake-applying mechanisms, four in number, are secured to the torque plate, each to operate a friction pad.

One embodiment of the present invention will now be described with reference to the accompanying drawings, and this brake is suitable for installation in a heavy armoured vehicle, such as a tank. Of the drawings:

Figure 1 is a side elevation of a servo brake according to the invention,

Figure 2 is a section on the line 2—2 of Figure 1,

Figure 3 is a detailed perspective view of a portion of the friction pad carrier, and Figure 4 is a view of the upper portion of Figure 1 showing the fluid-pressure means for applying the secondary brake.

According to the invention the annular disc 1 is secured at its inner periphery by nuts and bolts 2 to an annular flange 3 extending outwardly from a main driving shaft 4. A torque plate or housing 5 to accommodate the secondary brake is non-rotatably secured to a part of the tank structure and said housing 5 comprises two substantially rectangular plates 6 extending diametrically across the disc 1 and axially-aligned one on each side thereof. Each plate 6 is provided with a peripheral flange 7 extending axially away from the disc 1. The ends of said plates 6 project beyond the outer periphery of the disc 1 and said ends are connected by bridging members 8 which are provided on the inner sides with two projecting ribs 9, between them defining a channel 10 which is aligned with the outer periphery of the disc 1.

The primary brake 11 comprises a flexible band 12 having a lining 13 of friction material to engage the outer periphery of the disc 1. The two adjacent ends 14, 15 of the band 12 are normally urged apart by a spring 15a but are drawn together, to effect primary braking, by a cable 16 connected to a hand-lever or the like (not shown) under the control of an operator. To prevent the band 12 from slipping off the periphery of the disc it is located in the two channels 10, hereinabove described, forming part of the bridging members 8. Means to maintain the band co-axial relative to the disc comprise two pins 12a carried out from the tank structure and upon which the band rests.

Two pad-carrier plates 17 are provided (Figure 3), each comprising an annulus 18, which is a clearance fit over the driving shaft 4, having two diametrically-opposed pad carriers 19 extending radially therefrom. A mild steel pressing 20 is secured to said pad carriers 19 and is provided with ridges 21 to engage complementary slots 22 in an associated pad 23 of friction material of segmental shape, whereby the pad 23 can be slid radially on or off the carrier 19. The ends of the pad carriers 19 are provided with dogs 24 which are located between lugs 25 secured to the bridging members 8. The pad-carrier plates 17, with pads 23 attached, are located between the disc 1 and the adjacent plates 6 comprising the housing 5 and are axially-slidable relative thereto, the dogs 24 having axial movement between the lugs 25, but being constrained thereby against rotation.

Four hydraulic cylinders 26 are provided, each being secured through spacing members 27 to the housing and each being axially-aligned with a pad 23 of friction material. The open end of each cylinder 26 is presented towards the housing and a piston 28 is fluid-tightly fitted in each cylinder and has a stem 29 integral therewith which projects axially through an aperture 30 in the associated end of the housing 5 and abuts the side of a pad carrier 19 remote from the friction pad 23. A dust seal 31 is provided to prevent the entry of moisture or dirt into the cylinder 26.

The flexible band 12 comprising the primary brake 11 has a lug 37 secured thereto and this lug is engaged between the bifurcations of a depending lug 38 which is secured to a horizontal rod 39 slidable in bearing members 40 secured to a non-rotatable portion of the vehicle. A pin 41 is passed through a hole in the lug 37 and engages in a slot 42 formed in the bifurcations of the lug 38. Thus, upon angular movement of the lug 37 in either direction from its central position the rod 39 is adapted to be slid in the bearing blocks 40 in the same direction. A pair of vertical arms 43 are secured one to each end of the rod 39, each in abutment with the adjacent end of one of the piston rods 44, 45 of a conventional type of double-acting master cylinder 46 so that movement of the rod 39 in either direction causes one or the other of the piston rods 45 to be operated to force fluid-pressure through the conduit 32a to the fluid-pressure cylinders 26 to move the pistons 28 and pad carrier plates 19 axially towards the disc 1 and thus effect frictional engagement between the friction pads 23 and the disc.

The brake operates as follows: The primary brake 11 is operated manually by the operator tensioning the cable 16, and this draws the flexible band 12 and associated friction lining 13 more tightly around the periphery of the disc 1, and the rotating disc tends to draw the flexible band 12 of the primary brake 11 in the same direction as a result of this engagement. The flexible band 12 is linked to the piston rods 44, 45 of the master cylinder 46 through the lugs 37, 38 rod 39 and arms 43 and angular movement of the flexible band 12 thus depresses one or the other of the piston rods 44, 45 to pressurize the liquid in the master cylinder 46. This increase in pressure is transmitted to the four cylinders 26 of the secondary brake to force the four friction pads 23 against the radially-extending sides of the disc 1 and thus effect the secondary or main braking.

Braking pressure is removed by decreasing the tension in the cable 16. The primary brake 11 is thus released, and the piston rod 44 or 45, and its associated piston (not shown), is withdrawn by a return spring (one of which may conveniently be associated with each collapsible gaiter 47) to depressurize the hydraulic liquid and also to centralize the flexible band 12 of the primary brake 11. With the hydraulic pressure thus removed the disc 1 can rotate freely once more.

Having now described my invention, what I claim is:

1. A servo-assisted disc brake comprising a rotatable disc, a pair of non-rotatable torque plates, one on each side of said disc, and extending across said face of said disc, means connecting said torque plates beyond the periphery of said disc, a primary brake including a shoe located by said connecting means to frictionally engage the outer periphery of said disc and angularly movable thereby, means to apply said primary brake, a secondary brake including pads of friction material having friction faces opposed to the sides of said disc and slidably disposed in said torque plates to slide axially to and from frictional engagement with the sides of said disc, fluid-pressure operated mechanisms to operate said secondary brake, and means actuated by angular movement of said shoe to pressurize said mechanism.

2. A brake as claimed in claim 1 wherein said torque plate comprises a pair of parallel plates extending diametrically across opposite sides of the disc, and wherein a pad-carrier plate is located between each of said parallel plates and the disc, and two pairs of friction pads are provided, one pad being removably associated with a respective end of each of said plates.

3. A brake as claimed in claim 2 wherein the adjacent ends of said plates are joined together adjacent the periphery of the disc by bridging members and said primary brake shoe comprises a flexible band having friction material secured thereto, said band extending between the plates and between said periphery of the disc and said bridging members.

4. A brake according to claim 1 wherein said fluid-pressure operated mechanisms are secured to said torque plate, each said mechanism being adapted to operate one of said friction pads.

5. A brake according to claim 4 wherein each of said friction pads is removably associated with a pad-carrier plate and is adapted to be forced into frictional contact with said disc by movement of said pad-carrier plate on actuation of said fluid-pressure operated mechanism.

References Cited in the file of this patent

UNITED STATES PATENTS

| | | |
|---|---|---|
| 1,726,739 | Henry | Sept. 3, 1929 |
| 1,732,309 | Loughead | Oct. 22, 1929 |
| 1,943,842 | Sanford | Jan. 16, 1934 |
| 2,419,113 | Bricker | Apr. 15, 1947 |
| 2,596,556 | Hollerith | May 13, 1952 |
| 2,827,985 | Butler | Mar. 25, 1958 |

FOREIGN PATENTS

| | | |
|---|---|---|
| 201,610 | Australia | Apr. 6, 1956 |
| 706,640 | Great Britain | Mar. 31, 1954 |